United States Patent [19]
Fesler et al.

[11] Patent Number: 5,917,887
[45] Date of Patent: Jun. 29, 1999

[54] EMERGENCY ALERT COMMUNICATION SYSTEM WHEREIN EMERGENCY MESSAGES ARE RECEIVED BY A RADIO FREQUENCY RECEIVER AND ROUTED TO A TELEPHONE DEVICE

[75] Inventors: Kenneth A. Fesler, Sunnyvale; Carl Goy, Fremont, both of Calif.

[73] Assignee: TFT, Inc., Santa Clara, Calif.

[21] Appl. No.: 08/925,253

[22] Filed: Sep. 8, 1997

[51] Int. Cl.⁶ .................................................. H04M 11/04
[52] U.S. Cl. .......................... 379/48; 455/556; 455/166.2
[58] Field of Search ..................... 379/37–51; 455/166.2, 455/552, 555, 556

[56] References Cited

U.S. PATENT DOCUMENTS

| | | | |
|---|---|---|---|
| 3,694,579 | 9/1972 | McMurray | 179/5 R |
| 4,155,042 | 5/1979 | Permut et al. | 325/64 |
| 4,219,698 | 8/1980 | Birilli et al. | 179/5 P |
| 4,403,212 | 9/1983 | Masaki | 340/311.1 |
| 4,415,771 | 11/1983 | Martinez | 179/5 R |
| 4,518,822 | 5/1985 | Martinez | 179/2 E |
| 4,651,339 | 3/1987 | Gibbs | 379/42 |
| 4,783,654 | 11/1988 | Ichikawa | 340/825.44 |
| 4,956,875 | 9/1990 | Bernard | 455/13 |
| 5,030,948 | 7/1991 | Rush | 340/825.44 |
| 5,117,449 | 5/1992 | Metroka et al. | 455/552 |
| 5,121,430 | 6/1992 | Ganzer | 380/48 |
| 5,396,650 | 3/1995 | Terauchi | 455/38.2 |
| 5,444,433 | 8/1995 | Gropper | 340/601 |
| 5,541,980 | 7/1996 | Urewicz | 379/61 |
| 5,548,323 | 8/1996 | Callahan | 348/9 |
| 5,574,999 | 11/1996 | Gropper | 455/166.2 |

*Primary Examiner*—Wing F. Chan
*Attorney, Agent, or Firm*—Jack M. Wiseman

[57] ABSTRACT

An emergency alert communication system comprising a radio frequency receiver. The radio frequency receiver decodes incoming emergency alert signals and demodulates data header signals and emergency alert voice message signals of the emergency alert signals. Included in the data header signals are event and location code signals, which are followed by the emergency alert voice message signals. The demodulated data header signals in the form of digital data header signals are applied to a microcontroller. A telephone keypad of a telephone device is actuated to enter into the microcontroller event and location code signals. Should the event and location code signals demodulated by the receiver and applied to the microcontroller match the event and location code signals entered into the microcontroller by the telephone keypad, the microcontroller routes through an audio switching circuit the emergency alert voice message signals to a speaker, a recording device and a telephone handset of a telephone device. The radio frequency receiver, the microcontroller, the telephone handset, the telephone keypad, the speaker, and the recording device are embodied in the telephone device.

22 Claims, 4 Drawing Sheets

EMERGENCY ALERT COMMUNICATION SYSTEM WHEREIN EMERGENCY MESSAGES ARE RECEIVED BY A RADIO FREQUENCY RECEIVER AND ROUTED TO A TELEPHONE DEVICE

BACKGROUND OF THE INVENTION

The present invention relates in general to emergency alert systems, and, more particularly, to an emergency alert communication system wherein emergency messages are received by a radio frequency receiver and routed to a telephone device.

The Martinez U.S. Pat. No. 4,518,822, granted on May 21, 1985, for Method And Apparatus For Automatically Establishing Telephone Communication Links, and the Martinez U.S. Pat. No. 4,415,771, granted on Nov. 15, 1983, for Public Alert And Advising Systems, disclose a transmitter that transmits a digital alert message. The digital alert message comprises an address portion and a message portion. The transmitter transmits to receivers a phase modulated, narrow band signal for digital data or band limited voice signals. The receiver transmits the incoming digital alert message to a digital decoder where it is decoded to determine whether the digital address portion of the digital alert signal address matches the fixed digital address assigned to the particular decoder. If there is a match, the decoder decodes the message portion of the digital alert signal to determine what action is to be taken. Should the message portion of the digital alert signal match the fixed digital address, the decoder sends an ANSWER PHONE MESSAGE. At the same time, a central computer, which initiated the originally transmitted digital signal to the receiver, begins to automatically dial the regular telephone network associated with the receiver. The simultaneous sending of the ANSWER PHONE MESSAGE by the decoder and the ring tone originating from the dialing by the central computer cause a modem to be connected to the telephone line and a communication link is established between the phone and the central computer, via the receiver.

In the Urewicz U.S. Pat. No. 5,541,980, granted on Jul. 30, 1996 for Cordless Telephone/Radio Monitoring System, there is disclosed a cordless telephone/radio emergency alert system device incorporating therein a base unit and a handset. The base unit includes a broadcast receiver of the type used to receive emergency alert signals from the National Weather Service. Also included in the base unit are a demodulator and a speaker. The broadcast receiver is selectively tuned to the National Weather Service broadcasts. In the event of a weather emergency, an alert message from the National Weather Service will automatically be announced from the base unit and the handset unit of the telephone to advise the user of the weather emergency.

In the Terauchi U.S. Pat. No. 5,396,650, for Wireless Communication Device With Multi-Function Integrated Circuit Processing Card, there is disclosed a wireless device. Incorporated in the wireless device is a receiver for receiving an incoming radio message. A demodulator is also embodied within the wireless device, which demodulates the incoming radio message and which converts the incoming radio message into control signals for controlling the operation of the wireless device. Also embodied in the wireless device is a control unit for electrically processing the converted information and controlling the operation of the wireless device. The control unit compares identification in the converted information with a programmed identification supplied by a read-only memory. When the identification in the converted information matches the pre-programmed identification supplied by the read-only memory, data is recorded in a random access memory. The wireless device also includes a display unit which displays the incoming radio message under the control of the control unit when the identification in the message matches the identification supplied by the read-only memory. In a similar manner, a tone generating unit embodied in the wireless device generates a calling tone under the control of the control unit when the identification in the message matches the identification supplied by the read-only memory. In another embodiment, an IC card is employed in lieu of the control unit and performs the function of the control unit as above-described. The IC card stores therein an incoming radio message. When a mechanism for holding the IC card with the incoming radio message stored therein is connected to a telephone terminal, information about the telephone number of a party to be called is automatically produced based on the code included in the incoming radio message and a wireless call based on that information is automatically transmitted from the telephone terminal.

The Callahan U.S. Pat. No. 5,548,323, issued on Aug. 20, 1996, for Multiple Input Processor For Cable Television Head End Controller describes a multiple input processor. The multiple input processor is connected to the output of a NOAA radio receiver. A microcomputer controls the operation and the processing of signals through the multiple input processor. Instructions for the microcomputer are stored in a programmable memory. A message is stored in a digital voice recorder for playback. The messages received by the radio receiver are decoded and demodulated. Voice messages may be received and transmitted through a telephone interface. The voice message storage has the capability for digitally storing voice messages for later playback through the telephone interface.

The Ganzer et al. U.S. Pat. No. 5,121,430, issued on Jun. 9, 1992, for Storm Alert For Emergencies, discloses an emergency alert system. The emergency alert system includes a code generator which is part of a broadcast transmission system. The code generator produces a composite code signal. One component of the composite code signal designates a geographical area for receiving a message. Another component of the composite code signal designates the alert message for the designated geographical area. Remote receivers are tuned to the broadcast transmitter. The receivers demodulate the composite code signal and recover therefrom the composite signal. A data comparison circuit within the receivers compares the user location code with the designated geographical location code. Location codes are entered into the receivers by the user. If a match is detected a selected number of times over a predetermined time period, the receivers in which the match is detected will activate an alarm and the alert message is reproduced by the receiver.

In the McMurray U.S. Pat. No. 3,694,579, issued on Sep. 26, 1972, for Emergency Reporting Digital Communications Systems, there is disclosed a digital communication system which can be used for emergency reporting. The system includes a transmitter unit which sends out information signals identifying the transmitter unit and the type of emergency. A relay station receives and stores the signals. In response thereto, the relay station electronically dials a predetermined number to a data station, transmits an encoded signal identifying the station, and then relays the information sent from the transmitting unit.

SUMMARY OF THE INVENTION

An object of the present invention is to provide an emergency alert communication system in which a radio receiver receives emergency alert message signals and a controller or processor routes the emergency alert message signals to a telephone device.

Another object of the present invention is to provide an emergency alert communication system in which a radio receiver receives emergency alert signals having event and location code signals along with emergency alert message signals and in response to the event and location code signals received by the receiver matching an event and location code signals entered into a controller or processor, the controller or processor routes the emergency alert message signals to a telephone device.

Another object of the present invention is to provide an emergency alert communication system in which a radio receiver receives emergency alert signals having event and location code signals along with emergency alert message signals and in response to the event and location code signals received by the receiver matching event and location code signals entered into a controller or processor by a telephone device keypad, the controller or processor routes the emergency alert message signals to the telephone device.

Another object of the present invention is to provide an emergency alert communication system in which a radio receiver receives emergency alert signals having event and location code signals along with emergency alert message signals and in response to the event and location code signals received by the receiver matching an event and location code signals entered into a controller or processor by a telephone keypad, the controller or processor routes the emergency alert message signals to a voice recorder and a telephone handset of a telephone device. The telephone device embodies the radio receiver, the controller or processor, the telephone keypad, the telephone handset, and the voice recorder.

Another object of the present invention is to provide an emergency alert communication system in which a radio receiver receives emergency alert signals having an event and location digital code signals along with emergency alert voice message signals and in response to the event and location digital code signals received by the receiver matching event and location code signals entered into a controller or processor by a telephone keypad, the controller or processor routes the emergency alert voice message signals to a voice recorder and a telephone handset of a telephone device, and routes the event and location digital code signals to a display for the telephone device. The telephone device embodies the radio receiver, the controller or processor, the telephone keypad, the telephone handset, the voice recorder, and the display.

A feature of the present invention is that a ring tone different from a conventional ring tone is produced to inform the user of the incoming transmission of an emergency alert voice message.

Briefly described, the emergency alert communication system embodying the present invention comprises a radio frequency receiver. The radio frequency receiver decodes incoming emergency alert signals and, also, demodulates data header signals and emergency alert voice message signals of the emergency alert signals. The data header signals are followed by the emergency alert voice message signals. The demodulated data header signals in the form of digital data header signals are applied to an electronic processor. A telephone keypad of a telephone device is actuated to enter into the electronic processor data code signals. Should the digital data header signals applied to the electronic processor match the data code signals entered into the electronic processor, the electronic processor routes the emergency alert voice message signals to the telephone device.

DETAILED DESCRIPTION OF THE PREFERRED EMBODIMENTS

Figure 2:
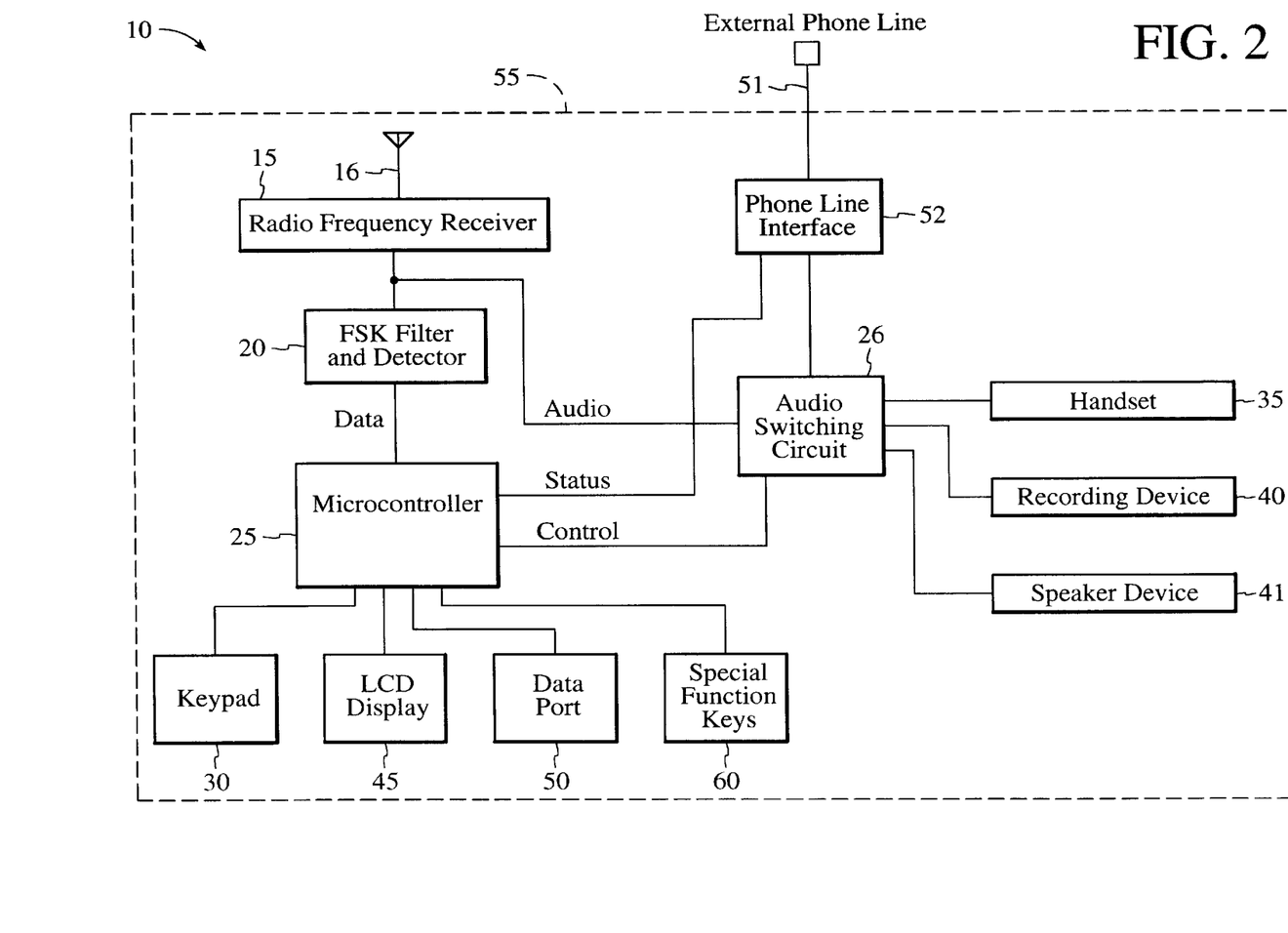
FIG. 2 is a block diagram of the emergency alert communication system.

Illustrated in FIG. 2 is the emergency alert communication system 10 of the present invention. The emergency alert communication system 10 comprises a suitable radio frequency receiver 15, such as a NOAA weather receiver. The radio frequency receiver 15 may be of the type that receives amplitude modulated signals, frequency modulated signals, television broadcast audio sub-carrier signals, or other special purpose transmission signals.

Incoming emergency alert signals are detected by an antenna 16 of the radio receiver 15. Included in the emergency alert signals are analog data emergency alert header signals followed by analog emergency alert voice message signals. In the exemplary embodiment, the data emergency alert header signals include location code signals and event code signals. The receiver 15 decodes the incoming emergency alert signals detected by the antenna 16 and demodulates the data emergency alert header signals and the emergency alert voice message signals that follow the data emergency alert header signals.

The analog data emergency alert signals are applied to a suitable analog-to-digital converter circuit. In the preferred embodiment, the analog-to-digital converter circuit is a frequency shift keying filter and detector circuit 20 which may include a tone detector circuit. A suitable tone detector circuit is manufactured by Exar Corporation of Fremont, Calif., as Part No. XR-2211A. In the exemplary embodiment, the radio frequency receiver 15 demodulates radio transmission and applies demodulated baseband analog data emergency alert header signals to the frequency shift keying filter and detector circuit 20.

The frequency shift keying filter and detector circuit 20 converts the frequency shift keying encoded analog data emergency alert signals to digital information signals as a serial bit stream. The demodulation of the data emergency alert header signals is performed by converting the mark frequency into digital high level signals and the space frequency into digital low level signals. The serial bit stream signals are similar to the RS-232 format and, in the preferred embodiment, are suitable for use by suitable electronic processing means, such as a microcontroller 25. Other electronic processing means may be employed, such as a microprocessor, a microcomputer, a central processing unit, or the like. The microcontroller 25, in the exemplary embodiment, is the INTEL 8051 sold by Intel Corporation of Santa Clara, Calif., or the Motorola 68HC11 sold by Motorola, Inc. of Schaumberg, Ill.

In the event the microcontroller 25 is a digital signal processor, then the frequency shift keying and detector functions may be incorporated into the digital signal processor. A suitable digital signal processor is manufactured and sold by Texas Instruments Corporation of Dallas, Tex., as the TMS320C26.

The audio output of the radio frequency receiver 15 follows several paths. One path leads to the frequency shift keying filter and detector circuit 20. Another path leads to a suitable audio switching circuit 26 under the control of the microprocessor 25. The frequency shift keying filter and detector circuit 20 converts the header audio data stream of the audio output of the radio frequency receiver 15 into header digital bit stream signals, when header data is present in the audio output. The audio output of the radio frequency receiver 15 provides emergency alert system voice message signals for passage through the audio switching circuit 26 under the control of the microcontroller 25. The emergency alert system voice message signals follow the header audio data stream signals.

The data serial bit stream signals of the data digital emergency alert signals include the location code signals and the event code signals decoded and demodulated by the radio frequency receiver 15 and applied to the microcontroller 25 by the frequency shift keying filter and detector 20. Additionally, the radio frequency receiver 15 transmits through the audio switching circuit 26 under the control of the microprocessor 25 the decoded and demodulated alert voice message signals.

Figure 5:
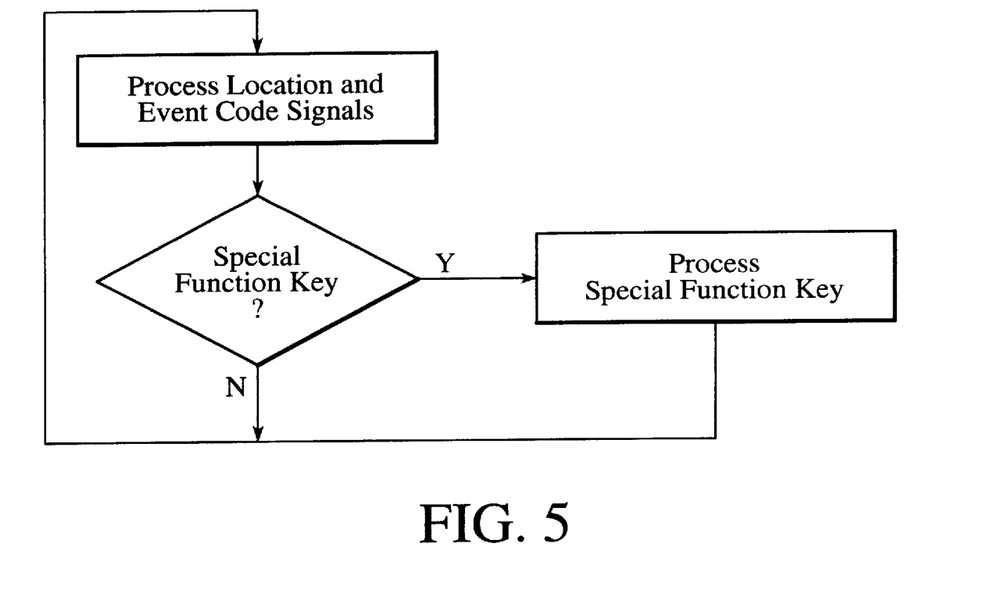
FIG. 5 is a flow chart of the operation of the emergency alert communication system shown in FIG. 2 while processing emergency alert event and location signals.

A telephone keypad 30 is actuated by the user of the emergency alert communication system 10 to enter into the microcontroller 25, the user's event code, and the user's location code. The telephone keypad 30, in the exemplary embodiment, is a touch-tone telephone keypad that is used on conventional touch-tone telephones. The microprocessor 25 detects, stores and compares the location code signals and the event code signals applied to the microcontroller 25 by the frequency shift keying filter and detector 20 with the user's event code signals and the user's location code signals entered into the microcontroller 25 by the keypad 30 (FIGS. 2 and 5). The telephone keypad 30 is a switch matrix having rows and columns. The microcontroller 25 scans the switch matrix and senses which keys have been actuated by the keypad 30 and stores the user's event code signals and the user's location code signals in a memory thereof. Alternatively, the user's event code signals and the user's location code signals originating from the keypad 30 may be stored in a suitable integrated circuit memory.

Special function keys 60 are used in conjunction with the keypad 30 to input event and location codes into the microcontroller 25 and to record and review messages in a recording device 40. One of the special function keys 60 is actuated before the keypad 30 is actuated to enter the user's event code signals and the user's location code signals. The special function keys include:

| | |
|---|---|
| Program/Operate | Play/Forward |
| Enter | Repeat |
| Speaker On/Off | Delete. |

While the preferred embodiment shows separate telephone keypads 30 and special function keys 60, it is apparent that a single set of keypads can include the keypads 30 and the special function keys 60.

Should the microcontroller 25 detect that the digital location code signals and the event code signals applied by the frequency shift keying filter and detector circuit 20 to the microcontroller 25 match the location code signals and the event code signals entered into the microcontroller 25 by the telephone keypad 30, then the microcontroller 25 routes the emergency alert voice message signals through the switching circuit 26 to a telephone handset 35, the recording device 40, and a speaker 41. In the exemplary embodiment, the telephone handset 35 is of the type used in well-known touch-tone telephones. The recording device 40, in the preferred embodiment, is a solid state semiconductor audio recording device. A suitable solid state semiconductor recording device is the ISD 2500 integrated circuit from ISD of San Jose, Calif.

When the microcontroller 25 detects that the digital location code signals and the event code signals applied to the microcontroller 25 by the frequency shift keying filter and detector circuit 20 match the location code signals and the event code signals entered into the microcontroller 25 by the telephone keypad 30, then the microcontroller 25 routes emergency alert data information signals to a liquid crystal display 45 and external equipment, not shown, for logging or printing emergency alert data information through a data port 50, such as RS-232 port, RS-485 port, infra-red IRDA, or similar data links. The emergency alert data information signals routed through the data port 50 are the header information signals applied to the microcontroller 25. Information signals for operating a printer may be formatted as ASCII data and may contain expanded translations of the event and location code signals contained in the emergency alert header signals.

Should the microcontroller 25 detect that the digital location code signals and the event code signals from the frequency shift keying filter and detector circuit 20 do not match the stored location code signals and the event code signals originating from the telephone keypad 30, then the microcontroller 25 will not route the emergency alert voice message signals to either the telephone handset 35, the recording device 20, or the speaker 41. Should the microcontroller 25 detect that the digital location code signals and the event code signals from the frequency shift keying filter and detector circuit 20 do not match the stored location code signals and the event code signals originating from the telephone keypad 30, then the microcontroller 25 will not translate the emergency alert data information signals nor route the emergency alert data information signals to the liquid crystal display 45 or the data port 50.

During the processing of emergency alert signals, the microcontroller 25 monitors incoming telephone calls over an external telephone line 51 through a telephone interface 52 and monitors location code signals and event code signals originating from the telephone keypad 30.

Figure 1:
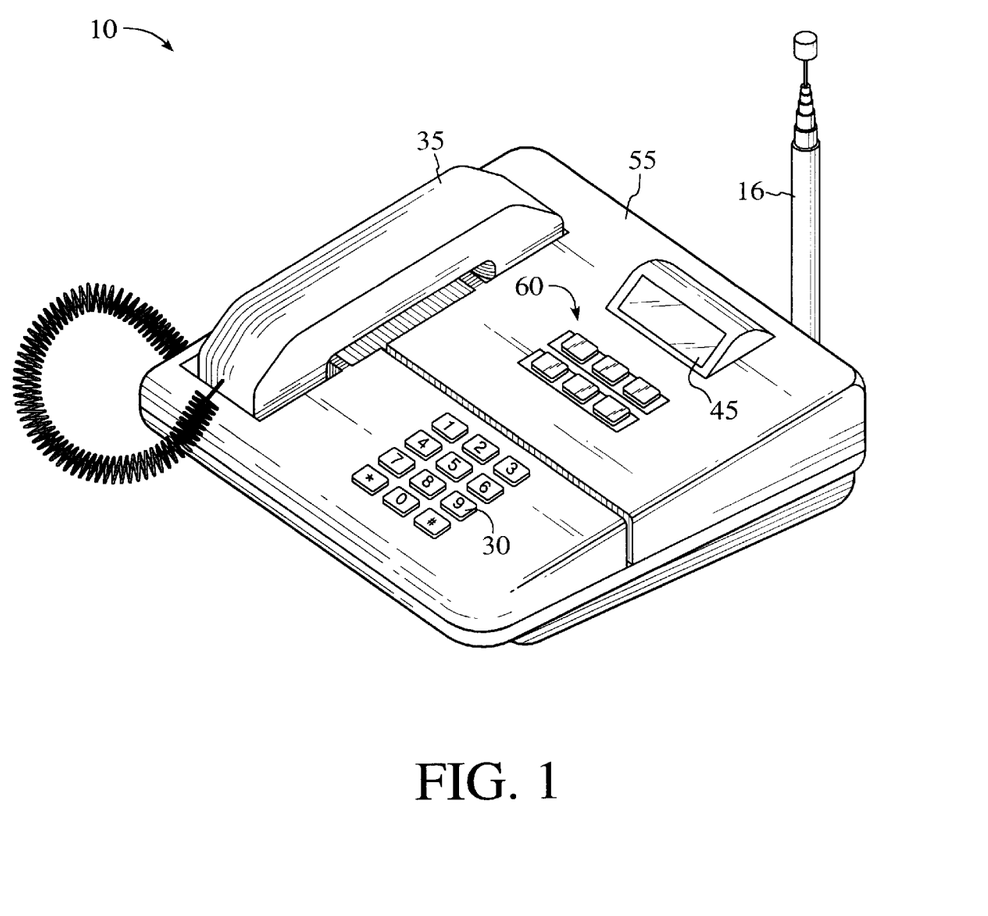
FIG. 1 is a perspective view of a telephone device incorporating the emergency alert communication system of the present invention.

In the preferred embodiment of the present invention, the radio receiver 15, the antenna 16, the frequency shift key filter and detector 20, the microcontroller 25, the audio switching circuit 26, the telephone keypad 30, the telephone handset 35, the recording device 40, the liquid crystal diode display 45, the speaker 41, and the data port 50 are embodied in or incorporated in a telephone device 55 (FIGS. 1 and 2).

Figure 3:
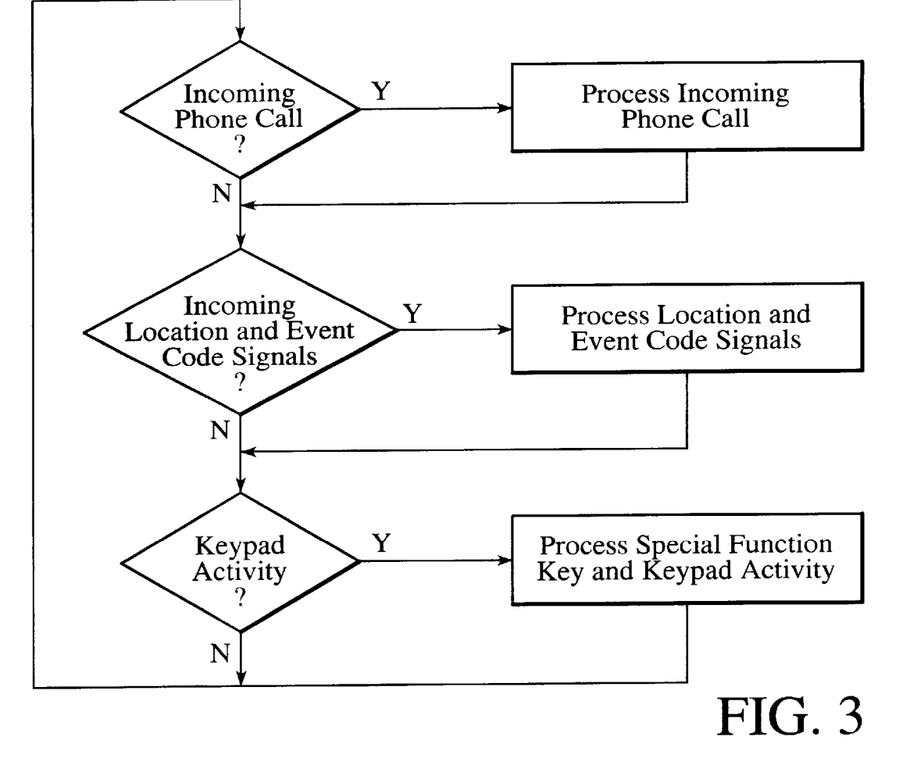
FIG. 3 is an operational flow chart of the emergency alert communication system shown in FIG. 2.

Illustrated in FIG. 3 is a flow chart that shows the activity of the initial or idle state of the emergency alert communication system 10. In the initial or idle state of the emergency alert communication system 10, the microcontroller 25 detects the activity of the radio receiver 15, the telephone handset 35 and its associated connections, the special function keys 60, and the telephone keypad 30. Should the microcontroller 25 detect signals originating from the radio receiver 15 or from the telephone handset 35 and its associated connections, the microcontroller 25 will respond to the detected signals and process the detected signals.

Should the microcontroller 25 detect that the digital location code signals and the event code signals from the frequency shift keying filter and detector circuit 20 do not match the stored location code signals and the event code signals originating from the telephone keypad 30, then the microcontroller 25 will not route the emergency alert voice message signals to either the telephone handset 35, the recording device 20, or the speaker 41. Should the microcontroller 25 detect that the digital location code signals and the event code signals from the frequency shift keying filter and detector circuit 20 do not match the stored location code signals and the event code signals originating from the telephone keypad 30, then the microcontroller 25 will not convert the emergency alert data information signals into text message signals nor route the emergency alert data information signals to the liquid crystal display 45.

Figure 4:
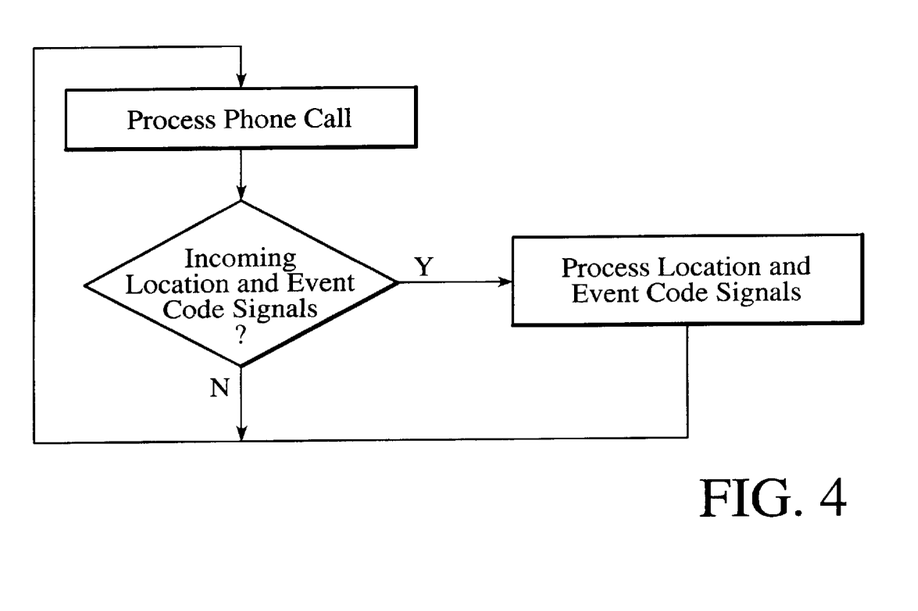
FIG. 4 is a flow chart of the operation of the emergency alert communication system shown in FIG. 2 while processing incoming communication through a telephone device.

In FIG. 4, there is illustrated a flow chart that shows the activity for processing an incoming telephone call over the external telephone line 51 and through the telephone line interface 52. An incoming call over the external telephone line 51 and through the telephone line interface 52 is detected by the microcontroller 25. The microcontroller 25 processes the incoming call and routes the incoming call to the telephone handset 35. The telephone handset 35 operates in the manner of a conventional telephone having an incoming telephone call routed thereto. The processing of an incoming telephone call includes the lifting of the telephone handset 35 from the cradle of the telephone device 55 by the user and thereupon the microcontroller 25 connects the external telephone line 51 and the telephone line interface 52 to the telephone handset 35 via the audio path and the audio switching circuit 26.

When the telephone handset 35 is removed from the cradle of the telephone unit 55, the telephone audio path is completed to the handset 35. Should the telephone handset 35 not be removed from the telephone cradle after a predetermined number of rings, an answering message is played for the incoming call and a telephone message from the incoming caller is recorded by the recording device 40. During the processing of an incoming telephone call, the microcontroller 25 monitors the digital location code signals and the event code signals of the emergency alert data signals from the frequency shift keying filter and detector 20.

While a telephone conversation is in progress, the microcontroller 25 monitors the location code signals and the event code signals applied to the microcontroller 25 by the frequency shift keying filter and detector circuit 20. Should the detected location code signals and the event code signals match the user's event code signals and the user's location code signals stored in the memory associated with the microcontroller 25 by the keypad 30, the microcontroller 25 either briefly interrupts the telephone conversation and/or provides a tone to be heard by the user of the handset 35 to indicate that an emergency message has been received. The microcontroller 25 also translates the emergency alert data information signals into text message signals and routes the emergency alert data information signals to the liquid crystal display 45. Simultaneously, the microcontroller 25 routes the emergency alert voice message signals decoded and demodulated by the radio frequency receiver 15 to the recording device 40 via the audio path and audio switching circuit 26. Should the user of the telephone device 55 elect to hear or receive the emergency voice message, the user of the telephone device 55 actuates one of the special function keys 60 (FIG. 1) on the telephone device 55.

FIG. 5 is a flow chart illustrating the activity of processing incoming emergency alert message signals from the radio frequency receiver 15. The microcontroller 25 processes the incoming emergency alert message signals and detects the location code signals and event code signals.

Should the microcontroller 25 detect that the digital location code signals and the event code signals applied by the frequency shift keying filter and detector circuit 20 to the microcontroller 25 match the location code signals and the event code signals stored in the memory associated with microcontroller 25, then the microcontroller 25 routes the emergency alert voice message signals through the switching circuit 26 to the telephone handset 35 and the recording device 40. The microcontroller 25 translates the emergency alert data information signals into text message signals and routes the text message signals to the liquid crystal display 45.

Emergency alert voice message signals decoded and demodulated by the radio frequency receiver 15 are recorded by the recording device 40 through the audio switching circuit 26 under the control of the microcontroller 25. Recorded emergency alert voice messages are played back by the recording device 40 by a command from one of the special function keys 60.

Figure 6:
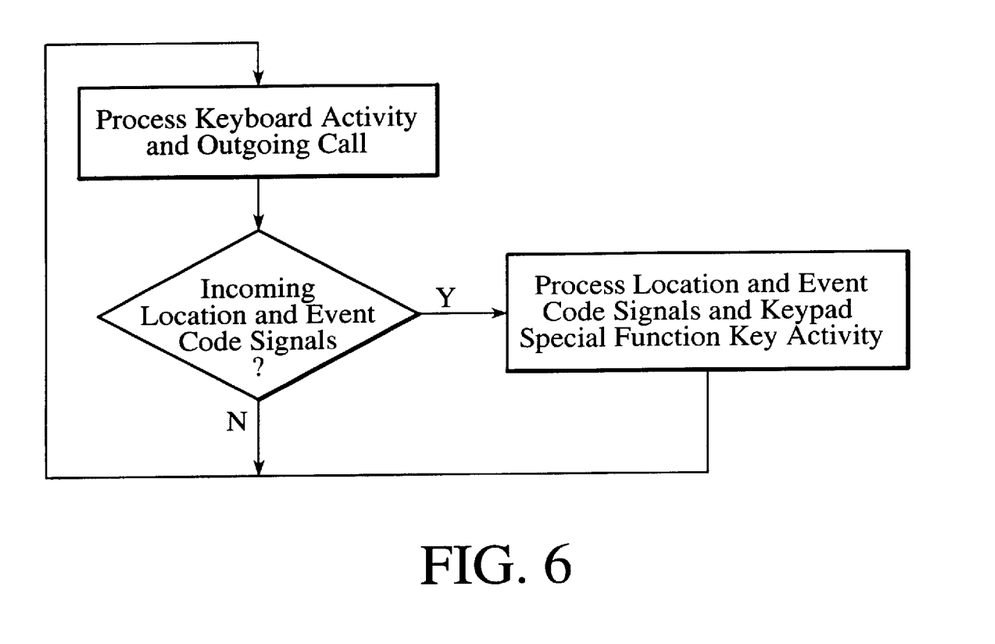
FIG. 6 is a flow chart of the operation of the emergency alert communication system shown in FIG. 2 while processing keypad activity and outgoing communication through a telephone device.

In FIG. 6, there is illustrated a flow chart that shows the activity for processing an outgoing telephone call from the handset 35 through the microcontroller 25 and the telephone line interface 52 and over the external telephone line 51. An outgoing telephone call is initiated by removing the telephone handset 35 from the cradle of the telephone device 55 by the user and then actuating the telephone keypad 30 by the user to dial the telephone number of the receiving party. The operation of the telephone handset 35 to initiate and complete a telephone call therefrom is well-known in the art. The microcontroller 25 provides a communication path through the audio switching circuit 26 for the outgoing call between the telephone handset 35 and the external telephone line 51. During the processing of an outgoing call, the microcontroller 25 monitors the digital location code signals and the event code signals of the emergency alert data signals from the frequency shift keying filter and detector 20.

An emergency alert ringing signal is produced by the speaker 41 under the control of the microcontroller 25, when the microcontroller 25 detects the event code signals and the location code signals match the user's event code signals and the location code signals entered into the microcontroller 25 by the keypad 30. The microcontroller 25 sends the telephone incoming emergency alert ringing signal produced by the microcontroller 25 to the speaker 41. The telephone ringing signal produced by the speaker 41 under the control of the microcontroller 25 is of a frequency different from the conventional ringing tone frequency produced by the speaker 41 from a voltage supplied by the external line 51.

Emergency alert voice message signals are recorded by the recording device 40 by the microcontroller 25 switching the audio input of the recording device 40 from the external telephone line 51 to the emergency alert voice message communication path through audio switching circuit 26. The recording device 40 thereupon records the emergency alert voice message signals. Recorded emergency alert voice messages are played back by the recording device 40 by the actuation of one of the special function keys 60.

What is claimed is:

1. An emergency alert communication system in which radio frequency emergency alert signals are transmitted, said radio frequency emergency alert signals include a header having data code signals followed by emergency alert voice message signals, said emergency alert communication system comprising:
   (a) a radio frequency receiver for decoding and demodulating said radio frequency emergency alert signals to provide decoded and demodulated data code signals followed by decoded and demodulated emergency alert voice message signals;
   (b) converting means responsive to decoded and demodulated data code signals for producing digital data code signals;
   (c) an audio switching circuit connected to said radio frequency receiver for receiving decoded and demodulated emergency alert voice message signals;
   (d) electronic processing means for detecting said digital data code signals and controlling the passage of said emergency alert voice message signals through said audio switching circuit;
   (e) audio reproducing means for producing an emergency alert voice message; and
   (f) a keypad connected to said electronic processing means for entering into said electronic processing means coded signals;
   (g) said electronic processing means comparing said digital data code signals from said converting means with said coded signals entered into said electronic processing means by said keypad, said electronic processing means being responsive to the matching of said digital data code signals from said converting means with said code signals entered into said electronic processing means by said keypad for routing said emergency alert voice message signals through said audio switching circuit to said audio reproducing means.

2. An emergency alert communication system as claimed in claim 1 wherein said audio reproducing means is a telephone handset.

3. An emergency alert communication system as claimed in claim 1 wherein said keypad is a telephone keypad.

4. An emergency alert communication system as claimed in claim 3 wherein said audio reproducing means is a telephone handset.

5. An emergency alert communication system as claimed in claim 4 and comprising a telephone device in which said radio frequency receiver, said electronic processing means, said telephone keypad, and said telephone handset are embodied.

6. An emergency alert communication system as claimed in claim 5 and comprising a recording device embodied in said telephone device, said electronic processing means routing said emergency alert voice message signals through said audio switching circuit to said recording device in response to said electronic processing means detecting a match between said digital data code signals from said converting means and said coded signals entered into said electronic processing means by said telephone keypad.

7. An emergency alert communication system as claimed in claim 5 and comprising a display for displaying digital data code information, said display being embodied in said telephone device, said electronic processing means routing said digital data code signals to said display in response to detecting a match between said digital data code signals from said converting means and said coded signals entered into said electronic processing means by said telephone keypad.

8. An emergency alert communication system as claimed in claim 5 and comprising a data port embodied in said telephone device, said electronic processing means routing said digital data code signals to said data port in response to detecting a match between said digital data code signals from said converting means and said coded signals entered into said electronic processing means by said telephone keypad.

9. An emergency alert communication system as claimed in claim 5, said electronic processing means in response to detecting a match between said digital data code signals from said converting means and said coded signals entered into said electronic processing means by said keypad provides an incoming emergency alert ringing signal for said telephone handset to produce an emergency ringing tone, said emergency alert ringing tone being different from the ringing tone normally produced by said headset.

10. An emergency alert communication system as claimed in claim 5 and comprising a speaker, said electronic processing means in response to detecting a match between said digital data code signals from said converting means and said coded signals entered into said electronic processing means by said telephone keypad provides a telephone incoming emergency alert ringing signal to said speaker, the tone of said incoming emergency alert ringing signal from said speaker being different from the tone of a telephone ringing signal from said speaker.

11. An emergency alert communication system as claimed in claim 1 and comprising an external telephone line interface connected to said electronic processing means, said electronic processing means being adapted to establish a communication path between said telephone handset and said external telephone line interface through said audio switching circuit.

12. An emergency alert communication system as claimed in claim 11 wherein a telephone conversation is in progress employing said telephone handset, said electronic processing means in response to detecting a match between said digital data code signals from said converting means and said coded signals entered by said keypad provides an alert tone during the telephone conversation in progress.

13. An emergency alert communication system as claimed in claim 11 wherein a telephone conversation is in progress employing said telephone handset, said electronic processing means in response to detecting a match between said digital data code signals from said converting means and said coded signals entered by said keypad interrupts said telephone conversation in progress.

14. An emergency alert communication system as claimed in claim 1 wherein said electronic processing means translates said digital data code signals into a text message in response to detecting a match between said digital data code signals from said converting means and said coded signals entered into said electronic processing means by said keypad.

15. An emergency alert communication system as claimed in claim 1 and comprising a display, said electronic processing means translates said digital data code signals into a text message and routes the digital data code signals to said display in response to detecting a match between said digital data code signals from said converting means and said coded signals entered into said electronic processing means by said keypad.

16. An emergency alert communication system in which radio frequency emergency alert signals are transmitted, said radio frequency emergency alert signals include a header having event code signals and location code signals followed by emergency alert voice message signals, said emergency alert communication system comprising:

(a) a radio frequency receiver for decoding and demodulating said radio frequency emergency alert signals to provide decoded and demodulated event code signals and location code signals followed by decoded and demodulated emergency alert voice message signals;

(b) converting means responsive to said decoded and demodulated event code signals and said location code signals for producing digital event code signals and digital location code signals;

(c) an audio switching circuit connected to said radio frequency receiver for receiving decoded and demodulated emergency alert voice message signals;

(d) electronic processing means for detecting said digital event code signals and said digital location code signals and controlling the passage of said emergency alert voice message signals through said audio switching circuit;

(e) audio reproducing means for producing an emergency alert voice message; and (f) a keypad connected to said electronic processing means for entering into said electronic processing means event code signals and location code signals;

(g) said electronic processing means comparing said digital event code signals and said digital location signals from said converting means with said event code signals and said location code signals entered into said electronic processing means by said keypad, said electronic processing means being responsive to the matching of said digital event code signals and said location code signals from said converting means with said event code signals and said location code signals entered into said electronic processing means by said keypad for routing said emergency alert voice message signals through said audio switching circuit to said audio reproducing means.

17. An emergency alert communication system as claimed in claim 16 wherein said audio reproducing means is a telephone handset.

18. An emergency alert communication system as claimed in claim 17 wherein said keypad is a telephone keypad.

19. An emergency alert communication system as claimed in claim 17 and comprising a telephone device in which said radio frequency receiver, said electronic processing means, said telephone keypad and said telephone handset are embodied.

20. An emergency alert communication system as claimed in claim 19 and comprising a recording device embodied in said telephone device, said electronic processing means routing said emergency alert voice message signals through said audio switching circuit to said recording device in response to said electronic processing means detecting a match between said digital event code signals and said digital location code signals from said converting means and said event code signals and said location code signals entered into said electronic processing means by said telephone keypad.

21. An emergency alert communication system as claimed in claim 16 and comprising an external telephone line interface connected to said electronic processing means, said electronic processing means being adapted to establish a communication path between said telephone handset and said external telephone interface through said audio switching circuit.

22. An emergency alert communication system as claimed in claim 21 wherein a telephone conversation is in progess employing said telephone handset, said emergency alert communication system comprising a recording device, said electronic processing means in response to detecting a match between said digital event code signals and said digital location code signals from said converting means and said event code signals and said location code signals entered into said electronic processing means by said keypad routes said emergency alert voice message signals through said audio switching circuit to said recording device.

* * * * *